July 27, 1926.
K. DE E. BARROWS
VANITY CASE
Filed Nov. 24, 1925
1,594,147
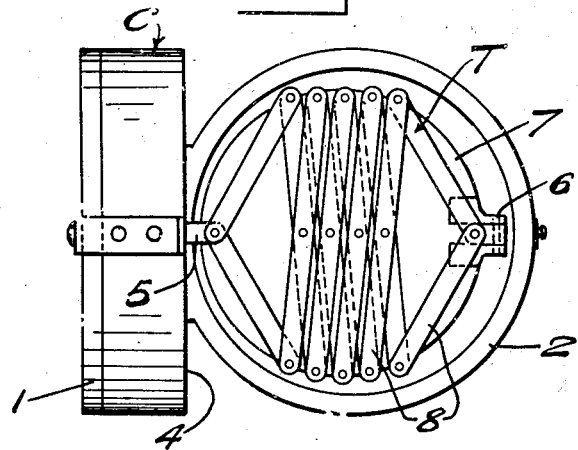
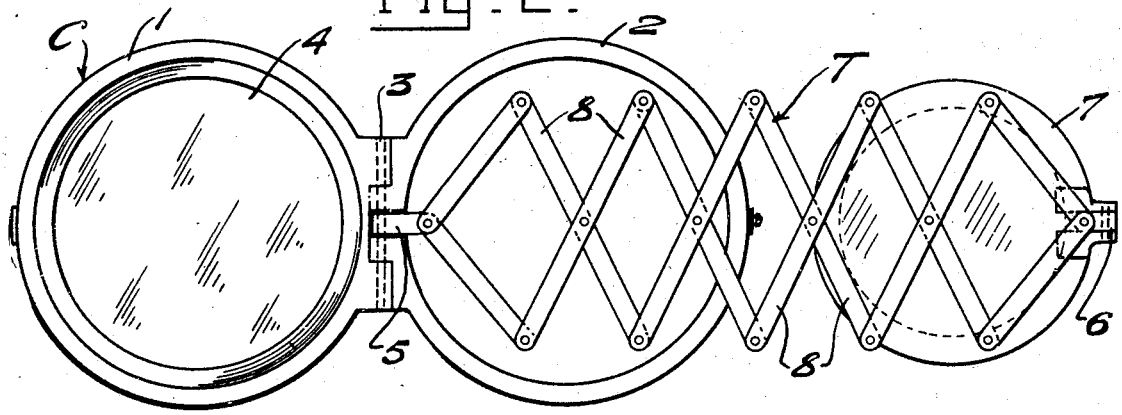
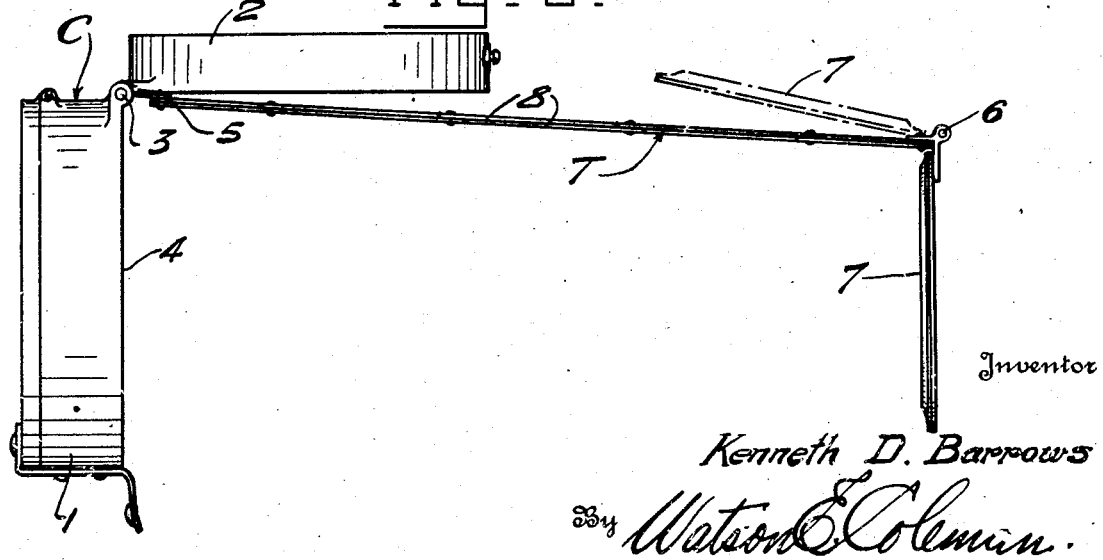
Inventor
Kenneth D. Barrows
By Watson E. Coleman
Attorney Patented July 27, 1926.

1,594,147

UNITED STATES PATENT OFFICE.

KENNETH DE EARL BARROWS, OF SYRACUSE, KANSAS.

VANITY CASE.

Application filed November 24, 1925. Serial No. 71,141.

This invention relates to certain improvements in vanity cases and it is an object of the invention to provide a device of this kind provided with two mirrors, one being extensible with respect to the case to provide means whereby the two mirrors may be so relatively arranged to permit visual access to the back of the head or neck and thus providing a case which is of particular advantage to those of the feminine sex having bobbed hair.

The invention consists in the details of construction and in the combination and arrangement of the several parts of my improved vanity case whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation of a vanity case constructed in accordance with an embodiment of my invention and partly open;

Figure 2 is a view in elevation of a vanity case embodying my invention fully open with the movable mirror extended;

Figure 3 is a view in top plan of the device as herein disclosed with the case partly open and the movable mirror extended, a second position of the mirror being indicated by broken lines.

As disclosed in the accompanying drawings, C denotes a vanity case comprising the sections 1 and 2 hingedly connected, as at 3, in a conventional manner. Arranged within the section 1 which may be termed the body of the case is a mirror 4 and the desired powder and puff are preferably arranged inwardly of such mirror. This, however, forms no particular part of my present invention.

Operatively engaged, as at 5, with the inner face of the section 2 at a point in close proximity to its hinged connection 3 is an extremity of a lazy bar connection T which, when substantially fully extended, projects its opposite or free end portion a distance of substantially twelve inches from its connection 5. The outer end portion of this lazy bar connection T is operatively engaged, as at 6, with a second mirror 7. The arms 8 of the toggle T are of such length as to be readily received within the section 2 when the toggle is retracted and at the same time permits the mirror 7 to also be readily received therein so that when not in use the mirror 7 and the toggle T are housed within the section 2.

The operative connection 6 between the lazy bar connection T and the mirror 7 is such as to permit the mirror 7 to have swinging movement with respect to the lazy bar connection to facilitate its application within the section 2 of the case and also to permit an effective adjustment when extended for use.

My improved case is especially adapted for use by those of the feminine sex having bobbed hair as the lazy bar connection T readily permits the mirror 7 to be so extended and positioned or adjusted with respect to the mirror 4 to permit, by reflection, visual access to the back of the head and neck.

When the lazy bar connection T has been retracted to bring the arms 8 in a closely related assembly, as illustrated in Figure 1, the mirror 3 may be readily swung inwardly to substantially overlie the same, such adjustment permitting the mirror and retracted arms to be readily received within the section 2 of the case.

When the section 2 is in open position, the retracted arms 8 and mirror 3 when swung out of said section 2 readily permit an extension of the mirror 7 by pull upon the mirror 7 or otherwise causing the arms 8 to have a relative separating movement.

From the foregoing description it is thought to be obvious that a vanity case constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a vanity case, a mirror housed therein, a second mirror adapted to be housed within the case, and a lazy bar connection between the second mirror and the case permitting said second mirror to be extended or retracted with respect to the case, said connection comprising a plurality of pivotally connected arms providing a lazy bar connection.

2. In combination with a vanity case, a mirror housed therein, a second mirror adapted to be housed within the case, and a lazy bar connection between the second mirror and the case permitting said second mirror to be extended or retracted with respect to the case, said connection comprising a plurality of pivotally connected arms providing a lazy bar connection, said second mirror overlying the retracted lazy bar connection when housed within the case.

3. In combination with a vanity case, a mirror housed therein, a second mirror adapted to be housed within the case, and a lazy bar connection between the second mirror and the case permitting said second mirror to be extended or retracted with respect to the case, said second mirror having independent swinging movement with respect to the lazy bar connection.

4. In combination with a vanity case, a mirror adapted to be housed within the case, and a lazy bar connection between the mirror and the case permitting said mirror to be extended or retracted with respect to the case, said mirror having independent swinging movement with respect to the lazy bar connection.

In testimony whereof I hereunto affix my signature.

KENNETH DE EARL BARROWS.